(12) United States Patent
Chen et al.

(10) Patent No.: US 11,129,105 B2
(45) Date of Patent: Sep. 21, 2021

(54) INFORMATION TRANSMISSION METHOD AND DEVICE, AND STORAGE MEDIUM

(71) Applicant: XI'AN ZHONGXING NEW SOFTWARE CO., LTD., Shaanxi (CN)

(72) Inventors: Xianming Chen, Guangdong (CN); Bo Dai, Guangdong (CN); Kun Liu, Guangdong (CN); Weiwei Yang, Guangdong (CN); Huiying Fang, Guangdong (CN)

(73) Assignee: XI'AN ZHONGXING NEW SOFTWARE CO., LTD, Xi'an Shaanxi (CN)

( * ) Notice: Subject to any disclaimer, the term of this patent is extended or adjusted under 35 U.S.C. 154(b) by 0 days.

(21) Appl. No.: 16/651,461

(22) PCT Filed: Sep. 14, 2018

(86) PCT No.: PCT/CN2018/105849
§ 371 (c)(1),
(2) Date: Mar. 27, 2020

(87) PCT Pub. No.: WO2019/062565
PCT Pub. Date: Apr. 4, 2019

(65) Prior Publication Data
US 2020/0267657 A1     Aug. 20, 2020

(30) Foreign Application Priority Data

Sep. 28, 2017 (CN) .......................... 201710900039.2

(51) Int. Cl.
*H04W 52/02* (2009.01)
*H04W 8/14* (2009.01)

(52) U.S. Cl.
CPC ......... *H04W 52/0238* (2013.01); *H04W 8/14* (2013.01)

(58) Field of Classification Search
CPC ... H04W 52/02; H04W 52/0238; H04W 8/14; H04W 48/12; H04W 48/16; Y02D 30/70
See application file for complete search history.

(56) References Cited

U.S. PATENT DOCUMENTS

| | | | |
|---|---|---|---|
| 6,791,466 B1 * | 9/2004 | Chang | H04J 3/0602 340/4.21 |
| 2011/0069672 A1 * | 3/2011 | Lee | H04L 5/0053 370/330 |

(Continued)

FOREIGN PATENT DOCUMENTS

| | | |
|---|---|---|
| CN | 101778342 A | 7/2010 |
| CN | 101827395 A | 9/2010 |

(Continued)

OTHER PUBLICATIONS

International Search Report for the International Patent Application No. PCT/CN2018/105849, dated Nov. 30, 2018, 2 pages.

(Continued)

*Primary Examiner* — Nathan S Taylor
(74) *Attorney, Agent, or Firm* — Kacvinsky Daisak Bluni PLLC

(57) ABSTRACT

Provided are an information transmission method and apparatus and a storage medium. The method includes: determining, by a network device, indication information about system information according to a system information state, where the indication information indicates a change condition of the system information within multi-level time ranges; and transmitting, by the network device, the indication information.

18 Claims, 3 Drawing Sheets

Receive indication information about system information, where the indication information indicates a change condition of the system information within multi-level time ranges — S202

Determine, according to the indication information, whether to receive the system information — S204

(56) References Cited

U.S. PATENT DOCUMENTS

| | | | |
|---|---|---|---|
| 2011/0103288 A1 | 5/2011 | Lee et al. | |
| 2011/0261739 A1* | 10/2011 | Fong | H04W 52/0216 370/311 |
| 2012/0115485 A1* | 5/2012 | Narasimha | H04W 68/02 455/437 |
| 2013/0286829 A1* | 10/2013 | Ishii | H04W 28/0205 370/230 |
| 2015/0016419 A1* | 1/2015 | Kim | H04W 24/02 370/331 |
| 2015/0043369 A1* | 2/2015 | Kim | H04W 24/08 370/252 |
| 2016/0198406 A1* | 7/2016 | Hoglund | H04W 76/28 370/311 |
| 2016/0234736 A1* | 8/2016 | Kubota | H04W 48/12 |
| 2019/0215828 A1* | 7/2019 | Kim | H04W 48/08 |
| 2019/0223094 A1* | 7/2019 | Ingale | H04W 68/005 |
| 2019/0319686 A1* | 10/2019 | Chen, IV | H04W 72/046 |
| 2020/0068477 A1* | 2/2020 | Awada | H04W 48/08 |
| 2020/0187100 A1* | 6/2020 | Kim | H04W 48/10 |

FOREIGN PATENT DOCUMENTS

| | | |
|---|---|---|
| CN | 102651890 A | 8/2012 |
| CN | 107040899 A | 8/2017 |
| WO | 2017078023 A1 | 5/2017 |

OTHER PUBLICATIONS

Ericsson., "System Information Update, Valuetag and Validity Time" 3GPP TSG-RAN WG2 #91bis Tdoc R2-154787, Oct. 9, 2015.

\* cited by examiner

INFORMATION TRANSMISSION METHOD AND DEVICE, AND STORAGE MEDIUM

CROSS-REFERENCES TO RELATED APPLICATIONS

This is a National Stage Application, filed under 35 U.S.C. 371, of International Patent Application No. PCT/CN2018/105849, filed on Sep. 14, 2018, which claims priority to a Chinese patent application No. 201710900039.2 filed on Sep. 28, 2017, contents of both of which are incorporated herein by reference in their entireties.

TECHNICAL FIELD

The present disclosure relates to the field of communications and, in particular, to an information transmission method and apparatus, and a storage medium.

BACKGROUND

In the related art, for example, in the Long Term Evolution (LTE) system, system information includes two parts: one part is master information block (MIB) which is transmitted through a physical broadcast channel, and the other part is system information block (SIB) which is transmitted through a physical downlink shared channel.

When the interval between the time when the terminal enters the network for the first time and the time when the terminal enters the network for the second time is far smaller than or far larger than a specified threshold value, the terminal performs an unnecessary operation of receiving the system information block. In the related art, the number of times a terminal entering a network according to different intervals receives system information blocks cannot be reduced simultaneously to the maximum extent, which finally cause unnecessary receiving power consumption of the terminal.

SUMMARY

Embodiments of the present disclosure provide an information transmission method and apparatus and a storage medium to at least avoid reception of unnecessary system information on the terminal.

According to a first embodiment of the present disclosure, an information transmission method is provided and includes the following steps: a network device determines indication information about system information according to a system information state, where the indication information indicates a change condition of the system information within multi-level time ranges; and the network device transmits the indication information.

According to a second embodiment of the present disclosure, another information transmission method is provided and includes the following steps: a terminal receives indication information about system information, where the indication information indicates a change condition of the system information within multi-level time ranges; and the terminal determines, according to the indication information, whether to receive the system information.

According to a third embodiment of the present disclosure, an information transmission apparatus is provided and includes a determination module and a transmission module. The determination module is configured to determine indication information about system information according to a system information state, where the indication information indicates a change condition of the system information within multi-level time ranges; and the transmission module transmission module is configured to transmit the indication information.

According to a fourth embodiment of the present disclosure, another information transmission apparatus is provided and includes a reception module and a determination module. The reception module is configured to receive indication information about system information, where the indication information indicates a change condition of the system information within multi-level time ranges; and the determination module is configured to determine, according to the indication information, whether to receive the system information.

According to a fifth embodiment of the present disclosure, a storage medium is further provided and includes stored programs. The programs, when executed, execute the information transmission method applied to the network device in the embodiments of the present disclosure, or execute the information transmission method applied to the terminal in the embodiments of the present disclosure.

According to a sixth embodiment of the present disclosure, a processor is further provided and is configured to execute programs. The programs, when executed, execute the information transmission method applied to the network device in the embodiments of the present disclosure, or execute the information transmission method applied to the terminal in the embodiments of the present disclosure.

According to the present disclosure, the terminal entering the network according to different time intervals can accurately determine the time when the system information does not change, so that reception of unnecessary system information by the terminal is reduced, the terminal will not receive unnecessary system information, and the power consumption caused by the terminal receiving the system information is finally reduced.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure, and do not form improper limits to the present disclosure. In the drawings.

DETAILED DESCRIPTION

The present disclosure will be described hereinafter in detail with reference to the drawings and in conjunction with embodiments. It is to be noted that if not in collision, the embodiments and features therein in the present application can be combined with each other.

It is to be noted that the terms "first", "second" and the like in the description, claims and drawings of the present disclosure are used to distinguish between similar objects and are not necessarily used to describe a particular order or sequence.

A communication system of the embodiments of the present application includes: a network device and a terminal, where the network device may communicate with the terminal in the coverage range of the communication area. As an example, the network device may be a network device such as a base station.

Figure 1:
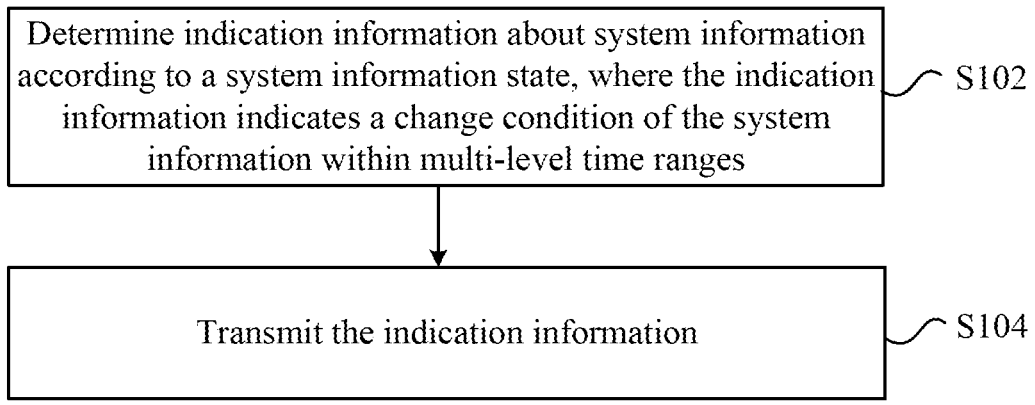
FIG. 1 is a flowchart of an information transmission method according to an embodiment of the present disclosure.

The embodiment provides an information transmission method. FIG. 1 is a flowchart of an information transmission method according to an embodiment of the present disclosure. As shown in FIG. 1, the method includes steps described below.

In step S102, a network device determines indication information about system information according to a system information state, where the indication information indicates a change condition of the system information within multi-level time ranges.

In step S104, the network device transmits the indication information.

According to the above steps, the terminal entering the network according to different time intervals can accurately determine the time when the system information does not change, so that reception of unnecessary system information by the terminal is reduced, the terminal will not receive unnecessary system information, and the power consumption caused by the terminal receiving the system information is reduced.

In the embodiment, the execution body of the above steps may be a network device such as a base station and a transmitter, and may also be a terminal, but is not limited thereto. The embodiment is illustrated by taking the base station as an example.

In an embodiment of the present application, the change condition of the system information within the multi-level time ranges includes: a change condition of the system information within the multi-level time ranges before the indication information is transmitted.

As an example, the change condition of the system information includes: whether the system information changes and/or a type of change of the system information.

The type of change of the system information corresponds to a set of predefined system parameters; when multiple types of changes of the system information exist, the multiple types are in one-to-one correspondence with multiple sets of predefined system parameters.

In an embodiment of the present application, the time ranges include N levels, and the indication information includes N bits; where the N-level time ranges are in one-to-one correspondence with the N bits, and N is an integer greater than 1.

As an example, for the i-th bit among the N bits of the indication information, a value of "1" indicates that the system information has changed within a specified time range before the indication information, and a value of "0" indicates that the system information has not changed within the specified time range before the indication information; where the magnitude of the specified time range is equal to the magnitude of the i-th level time range corresponding to the i-th bit.

In an embodiment of the present application, the step of determining the indication information about the system information according to the system information state includes: when the system information changes, a value of the i-th bit of the indication information within the i-th level time range after the system information changes is set to "1"; where i belongs to a set of {1, 2, 3, . . . , N}.

In an embodiment of the present application, any one of the multi-level time ranges is equal to at least one superframe in magnitude; the magnitudes of adjacent two levels of time ranges among the multi-level time ranges have a multiple relationship. The relationship may be at least one-fold. Assuming that the time ranges include 3 levels (i.e., N is equal to 3), the third-level time range may be equal to one superframe in magnitude, the second-level time range may be equal to two superframes in magnitude, and the first-level time range may be equal to four superframes in magnitude.

In an embodiment of the present application, the step of transmitting the indication information includes transmitting the indication information through a master information block.

In an embodiment, the step of transmitting the indication information through the master information block includes: jointly transmitting the indication information through master information blocks within a plurality of master information block periods; where each master information block within respective one of the plurality of master information block periods transmits part of bits of the indication information.

In an embodiment of the present application, the system information includes the system information block.

Figure 2:
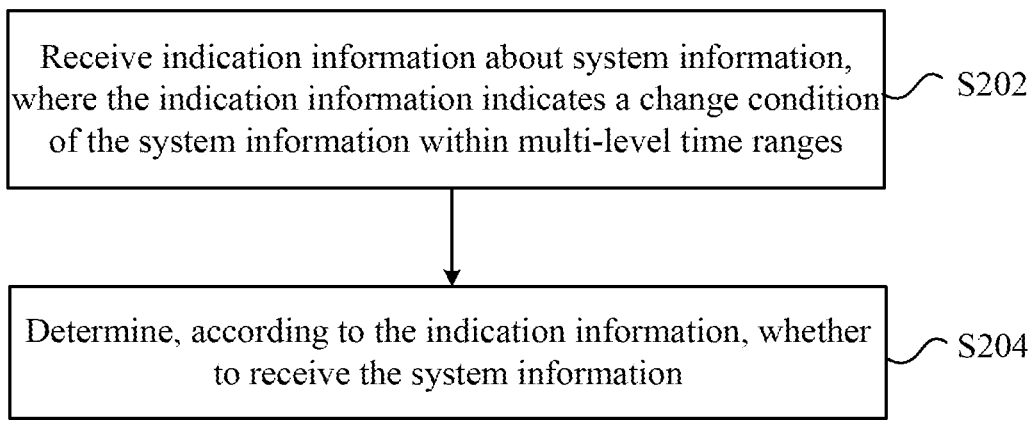
FIG. 2 is a flowchart of another information transmission method according to an embodiment of the present disclosure.

An embodiment provides another information transmission method. FIG. 2 is a flowchart of another information transmission method according to an embodiment of the present disclosure. As shown in FIG. 2, the method includes steps described below.

In step S202, a terminal receives indication information about system information, where the indication information indicates a change condition of the system information within multi-level time ranges.

In step S204, the terminal determines, according to the indication information, whether to receive the system information.

In the embodiment, the execution body of the above steps may be a terminal such as a mobile phone, and may also be a base station, but is not limited thereto. The embodiment is illustrated by taking the terminal as an example.

In an embodiment of the present application, the change condition of the system information within the multi-level time ranges includes: a change condition of the system information within the multi-level time ranges before the indication information is transmitted.

In an embodiment of the present application, the time ranges include N levels, and the indication information includes N bits; where the N-level time ranges are in one-to-one correspondence with the N bits, and N is an integer greater than 1.

As an example, for the i-th bit among the N bits of the indication information, a value of "1" indicates that the system information has changed within a specified time range before the indication information, and a value of "0" indicates that the system information has not changed within the specified time range before the indication information.

In an embodiment of the present application, the magnitude of the specified time range is equal to the magnitude of the i-th level time range corresponding to the i-th bit, and i belongs to a set of {1, 2, 3, . . . , N}.

In an embodiment of the present application, any one of the multi-level time ranges is equal to at least one superframe in magnitude; the magnitudes of adjacent two levels of time ranges among the multi-level time ranges have a multiple relationship. The relationship may be at least one-fold. Assuming that the time ranges include 3 levels (i.e., N is equal to 3), the third-level time range may be equal to one superframe in magnitude, the second-level time range may be equal to two superframes in magnitude, and the first-level time range may be equal to four superframes in magnitude.

In an embodiment of the present application, the following two scenarios exist in which the terminal determines, according to the indication information, whether to receive system information: when the N bits of the indication information are all "1", the terminal receives the system information; when the N bits are not all "1" and in response to determining that an interval between a moment when the terminal currently receives the indication information and a moment when the system information is last confirmed exceeds a specified threshold value, the terminal receives the system information.

In an embodiment of the present application, the specified threshold value is equal to the maximum value among magnitudes of all time ranges corresponding to all bits having a value of 0 among the N bits. For example, assuming that three bits (i.e., N is equal to 3) exist and the values of the three bits are "100" respectively; the bits with the value of "0" are the second bit and the third bit, and the second bit and the third bit respectively correspond to the second-level time range and the third-level time range; if the magnitude of the second-level time range is a multiple of the magnitude of the third-level time range (i.e., the second-level time range is greater than the third-level time range in magnitude), the specified threshold value is equal to the magnitude of the second-level time range.

In an embodiment of the present application, the step of receiving the indication information about the system information includes: receiving the indication information about the system information through a master information block.

In an embodiment, the step of receiving the indication information about the system information through the master information block includes: jointly receiving the indication information through master information blocks within a plurality of master information block periods; where a master information block within respective one of the plurality of master information block periods transmits part of bits of the indication information.

In an embodiment of the present application, the system information includes the system information block.

From the description of the above-mentioned embodiments, it will be apparent to those skilled in the art that the method in the embodiments described above may be implemented by software plus a necessary general-purpose hardware platform, or may of course be implemented by hardware. However, in many cases, the former is an implementation manner. Based on this understanding, the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method according to each embodiment of the present disclosure.

Embodiment Two

The embodiment further provides an information transmission apparatus. The apparatus is configured for implementing the above-mentioned embodiments and other embodiments. What has been described will not be repeated. As used below, the term "module" may be software, hardware or a combination thereof capable of implementing predetermined functions. The apparatus in the embodiment described below may be implemented by software, but implementation by hardware or by a combination of software and hardware is also possible and conceived.

Figure 3:
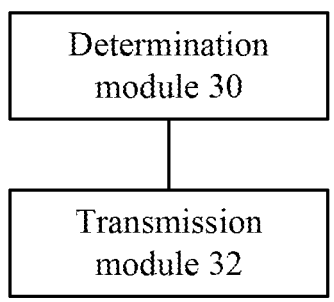
FIG. 3 is a structure block diagram of an information transmission apparatus according to an embodiment of the present disclosure.

FIG. 3 is a structure block diagram of an information transmission apparatus according to an embodiment of the present disclosure. As shown in FIG. 3, the apparatus includes a determination module 30 and a transmission module 32.

The determination module 30 is configured to determine indication information about system information according to a system information state, where the indication information indicates a change condition of the system information within multi-level time ranges.

The transmission module 32 is configured to transmit the indication information.

Figure 4:
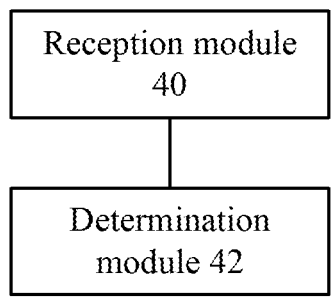
FIG. 4 is a structure block diagram of another information transmission apparatus according to an embodiment of the present disclosure.

FIG. 4 is a structure block diagram of another information transmission apparatus according to an embodiment of the present disclosure. As shown in FIG. 4, the apparatus includes a reception module 40 and a determination module 42.

The reception module 40 is configured to receive indication information about system information, where the indication information indicates a change condition of the system information within multi-level time ranges.

The determination module 42 is configured to determine, according to the indication information, whether to receive the system information.

It is to be noted that when the information transmission apparatus provided by the above-mentioned embodiment performs information transmission, an exemplary description is provided merely by the division of the program modules described above, and in practical applications, the processing described above may be distributed and performed by different program modules according to needs, that is, the internal structure of the apparatus is divided into different program modules to perform all or part of the processing described above. In addition, the information transmission apparatus in the above-mentioned embodiment has a same concept as the information transmission method in the above-mentioned embodiment, and for a specific implementation process, reference is made to the method embodiment and repetition is not made herein.

An embodiment further provides a system. The system includes the two types of apparatuses shown in FIGS. 3 and 4.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment Three

The embodiment is an embodiment of the present disclosure and used for describing the present application in detail in conjunction with examples.

In the related art, change information about system information is carried by one bit in a master information block; the one bit of the change information is set to "1" by the base station within a fixed time range (e.g., 10 hours) from the moment when a change of the system information block occurs. The terminal receives a system information block after determining that the one bit is equal to "1"; otherwise, whether the system information block is received is determined according to whether the interval between the time when the change information is currently received and the time when the system information block is last confirmed exceeds the magnitude of a fixed time range. Based on the above method, when the interval between the time when the terminal enters the network for the second time and the time when the terminal enters the network for the first time is far smaller than or far larger than the magnitude of the fixed time range, the terminal performs an unnecessary operation of receiving the system information block.

The embodiment includes the following steps: after determining indication information about a system information block according to a state of the system information block, a base station transmits the indication information; after receiving the indication information about the system information block, the terminal determines, according to the indication information, whether to receive the system information block; where the indication information indicates a change condition of the system information block within multi-level time ranges.

The embodiment includes multiple implementation modes.

Implementation Mode One

In the implementation mode, a base station uses 2 bits in a master information block to transmit change information (equivalent to indication information about system information in the above-mentioned embodiments) about a system information block; the terminal acquires the change information about the system information block through 2 bits in the master information block.

When the system information block changes, the first bit of the change information within the first-level time range after the change of the system information block is set to "1" and the second bit of the change information within the second-level time range after the change of the system information block is set to "1".

Application Example One

Figure 5:
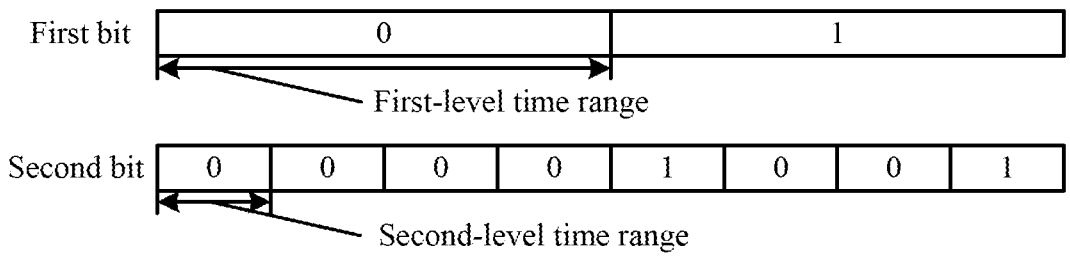
FIG. 5 is schematic diagram one illustrating transmission of change information about a system information block by using 2 bits according to an example.

FIG. 5 is schematic diagram one illustrating transmission of change information about a system information block by using 2 bits according to an example.

In the example, two consecutive first-level time ranges (including eight consecutive second-level time ranges) is taken as an example. The system information block changes at the beginning of the fifth second-level time range and at the beginning of the eighth second-level time range. When the system information block changes at the beginning of the fifth second-level time range, the first bit of the change information within the second first-level time range is set to "1"; and the second bit of the change information within the fifth second-level time range is set to "1". When the system information block changes at the beginning of the eighth second-level time range, the second bit of the change information within the eighth second-level time range is set to "1".

The time range in the example is an absolute time range.

When a terminal accesses a network within the fifth second-level time range and determines that the first bit of the change information is "1" and that the second bit of the change information is "1", the terminal receives the system information block. When the terminal enters the network within the sixth second-level time range and determines that the first bit of change information is "1" and that the second bit of the change information is "0", the terminal receives the system information block. When the terminal enters the network within the seventh second-level time range and determines that the first bit of the change information is "1" and that the second bit of the change information is "0", the terminal receives the system information block if the terminal has not received the system information block within the sixth second-level time range; otherwise, the terminal does not receive the system information block. When the terminal enters the network within the eighth second-level time range and determines that the first bit of the change information is "1" and that the second bit of the change information is "1", the terminal receives the system information block.

Application Example Two

Figure 6:
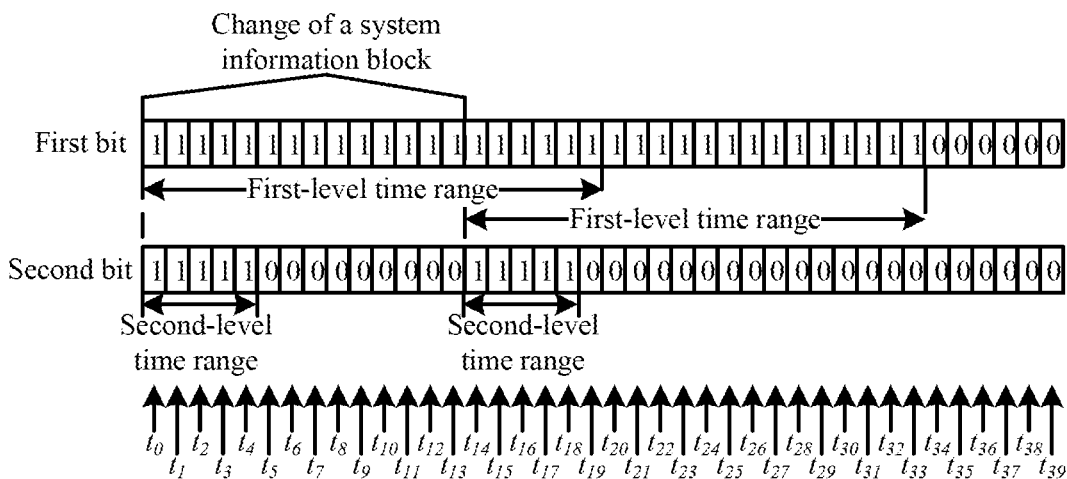
FIG. 6 is schematic diagram two illustrating transmission of change information about a system information block by using 2 bits according to an example.

FIG. 6 is schematic diagram two illustrating transmission of change information about a system information block by using 2 bits according to an example.

In the example, 40 consecutive time units (represented as t0 to t39) is taken as an example, the first-level time range includes 20 consecutive time units, and the second-level time range includes 5 consecutive time units. The system information block changes at the beginning of time unit t0 and time unit t14. When the system information block changes at the beginning of the time unit t0: within the first-level time range (including t0 to t19), the first bit of the change information is set to "1"; within the second-level time range (including t0 to t4), the second bit of the change information is set to "1" by the base station. Similarly, when the system information block changes at the beginning of the time unit t14: within the first-level time range (including t14 to t33), the first bit of the change information is set to "1" by the base station; within the range of time units t14 to t19, the first bit of the change information is already equal to "1", so "1" is just kept; within the second-level time range (including t14 to t18), the second bit of the change information is set to "1".

When the terminal accesses the network within the time units t0 to t14 and determines that the first bit of the change information is "1" and that the second bit of the change information is "1", the terminal receives the system information block. When the terminal enters the network within the time units t5 to t13 and determines that the first bit of the change information is "1" and that the second bit of the change information is "0", the terminal receives the system information block if the interval between a moment when the change information is currently received and a moment when the system information block is last confirmed exceeds 5 time units (i.e., the magnitude of the second-level time range); otherwise, the terminal does not receive the system information block. When the terminal enters the network within the time units t14 to t18 and determines that the first bit of the change information is "1" and that the second bit of the change information is "1", the terminal receives the system information block. When the terminal enters the network within the time units t19 to t33 and determines that the first bit of the change information is "1" and that the second bit of the change information is "0", the terminal receives the system information block if the interval between a moment when the change information is currently received and a moment when the system information block is last confirmed exceeds 5 time units (i.e., the magnitude of the second-level time range); otherwise, the terminal does not receive the system information block. When the terminal enters the network within the time units t34 to t39 and determines that the first bit of the change information is "0" and that the second bit of the change information is "0", the terminal receives the system information block if the interval between a moment when the change information is currently received and a moment when the system information block is last confirmed exceeds 20 time units (i.e., the magnitude of the first-level time range); otherwise, the terminal does not receive the system information block.

In all implementation modes, the terminal entering the network includes the terminal returning from outside the coverage and the terminal waking up from a power saving mode (PSM); one time unit includes one or more modification periods of the system information block.

Implementation Mode Two

In the implementation mode, a base station uses 3 bits in a master information block to transmit change information (indication information about system information) about a system information block; the terminal acquires the change information about the system information block through 3 bits in the master information block.

When the system information block changes, the first bit of the change information within the first-level time range after the change of the system information block is set to "1", the second bit of the change information within the second-level time range after the change of the system information block is set to "1", and the third bit of the change information within the third-level time range after the change of the system information block is set to "1".

Application Example One

Figure 7:
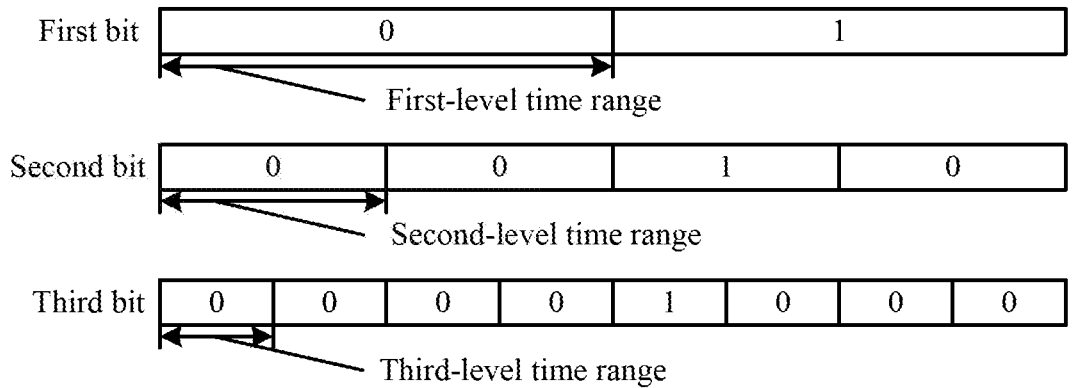
FIG. 7 is schematic diagram one illustrating transmission of change information about a system information block by using 3 bits according to an example.

FIG. 7 is schematic diagram one illustrating transmission of change information about a system information block by using 3 bits according to an example.

In the example, two consecutive first-level time ranges (including four consecutive second-level time ranges and eight consecutive third-level time ranges) is taken as an example. The system information block changes at the beginning of the fifth third-level time range. When the system information block changes at the beginning of the fifth third-level time range, the first bit of the change information within the second first-level time range is set to "1", the second bit of the change information within the third second-level time range is set to "1", and the third bit of the change information within the fifth third-level time range is set to "1".

The time range in the example is an absolute time range.

When the terminal accesses the network within the fifth third-level time range and determines that the first bit, second bit and third bit of the change information are "1", the terminal receives the system information block. When the terminal enters the network within the sixth third-level time range and determines that the first bit and second bit of the change information are "1" and that the third bit of the change information is "0", the terminal receives the system information block. When the terminal enters the network within the seventh third-level time range and determines that the first bit of the change information is "1" and that the second bit and third bit of the change information are "0", the terminal receives the system information block if the terminal has not received the system information block within the sixth third-level time range; otherwise, the terminal does not receive the system information block. When the terminal enters the network within the eighth third-level time range and determines that the first bit of the change information is "1" and that the second bit and third bit of the change information are "0", the terminal receives the system information block if the terminal has not received the system information block within the sixth third-level time range; otherwise, the terminal does not receive the system information block.

Application Example Two

Figure 8:
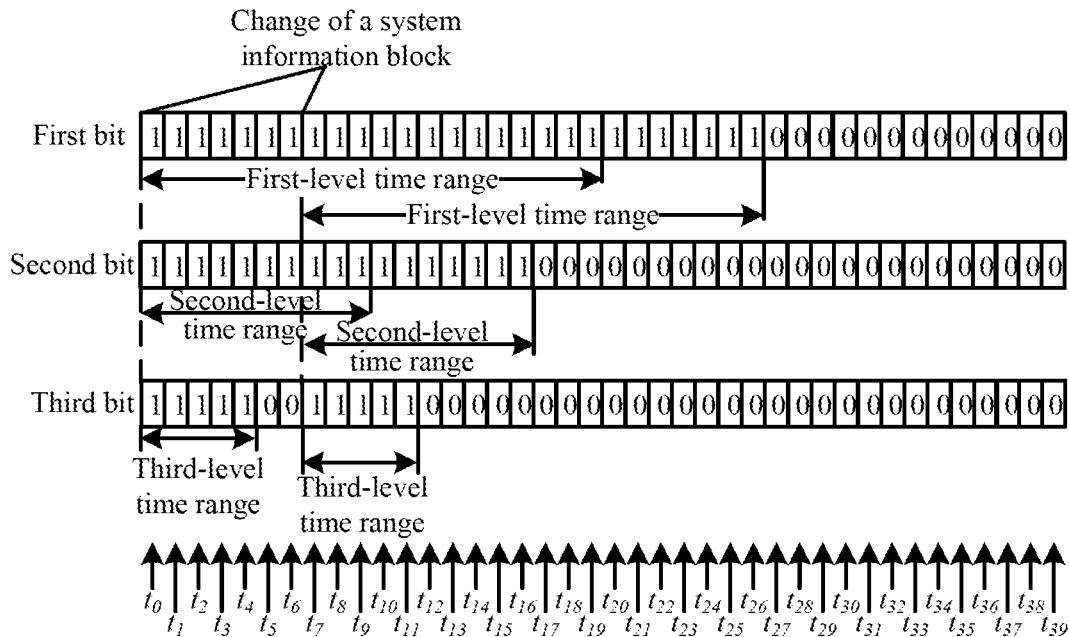
FIG. 8 is schematic diagram two illustrating transmission of change information about a system information block by using 3 bits according to an example.

FIG. 8 is schematic diagram two illustrating transmission of change information about a system information block by using 3 bits according to an example.

In the example, 40 consecutive time units (represented as t0 to t39) is taken as an example, the first-level time range includes 20 consecutive time units, the second-level time range includes 10 consecutive time units, and the third-level time range includes 5 consecutive time units. The system information block changes at the beginning of time unit t0 and time unit t7. When the system information block changes at the beginning of the time unit t0: within the first-level time range (including t0 to t19), the first bit of the change information is set to "1"; within the second-level time range (including t0 to t9), the second bit of the change information is set to "1"; within the third-level time range (including t0 to t4), the third bit of the change information is set to "1". When the system information block changes at the beginning of the time unit t7: within the first-level time range (including t7 to t26), the first bit of the change information is set to "1"; within the second-level time range (including t7 to t16), the second bit of the change information is set to "1"; within the third-level time range (including t7 to t11), the third bit of the change information is set to "1". When the first bit or the second bit or the third bit of the change information needs to be set to "1", "1" is just kept if the first bit or the second bit or the third bit of the change information is already equal to "1".

When the terminal accesses the network within the time units t0 to t4 and determines that the first bit, second bit and third bit of the change information are "1", the terminal receives the system information block. When the terminal enters the network within the time units t5 to t6 and determines that the first bit and second bit of the change information is "1" and that the third bit of the change information is "0", the terminal receives the system information block if the interval between a moment when the change information is currently received and a moment when the system information block is last confirmed exceeds 5 time units (i.e., the magnitude of the third-level time range); otherwise, the terminal does not receive the system information block. When the terminal enters the network within the time units t7 to t11 and determines that the first bit, second bit and third bit of the change information are "1", the terminal receives the system information block. When the terminal enters the network within the time units t12 to t16 and determines that the first bit and second bit of the change information is "1" and that the third bit of the change information is "0", the terminal receives the system information block if the interval between a moment when the change information is currently received and a moment when the system information block is last confirmed exceeds 5 time units (i.e., the magnitude of the third-level time range); otherwise, the terminal does not receive the system information block. When the terminal enters the network within the time units t17 to t26 and determines that the first bit of the change information is "1" and that the second bit and third bit of the change information are "0", the terminal receives the system information block if the interval between a moment when the change information is currently received and a moment when the system information block is last confirmed exceeds 10 time units (i.e., the magnitude of the second-level time range); otherwise, the terminal does not receive the system information block. When the terminal enters the network within the time units t27 to t39 and determines that the first bit, second bit and third bit of the change information are "0", the terminal receives the system information block if the interval between a moment when the change information is currently received and a moment when the system information block is last confirmed exceeds 20 time units (i.e., the magnitude of the first-level time range); otherwise, the terminal does not receive the system information block.

Implementation Mode Three

In the embodiment, a change condition of a system information block within multi-level time ranges is a change condition of the system information block within the multi-level time ranges before indication information is transmitted; the change condition of the system information block includes whether the system information block changes and/or a type of change of the system information block.

Application Example One

In the example, a change condition of the system information block includes whether the system information block changes and the type of change of the system information block; in this case, part of states of the indication information indicate whether the system information block changes, and the remaining states indicate the type of change of the system information block. Multiple types of changes of the system information block exist and the multiple types are in one-to-one correspondence with multiple sets of predefined system parameters.

In the example, assuming that indication information about the system information block includes 3 bits, the indication information about the system information block can take the following 8 states: "000", "001", "010", "011", "100", "101", "110" and "111". The indication information taken as "000" indicates that the system information block within the first-level time range before the indication information is transmitted has not changed; the indication information taken as "001" indicates that the system information block within the second-level time range before the indication information is transmitted has not changed; the indication information taken as "010" indicates that the system information block within the third-level time range before the indication information is transmitted has not changed; the indication information taken as "011" indicates that the system information block within the third-level time range before the indication information is transmitted has not changed. The indication information taken as "100" indicates that the system information block uses the first set of predefined system parameters; the indication information taken as "101" indicates that the system information block uses the second set of predefined system parameters; the indication information taken as "110" indicates that the system information block uses the third set of predefined system parameters; the indication information taken as "111" indicates that the system information block uses the fourth set of predefined system parameters. The first-level time range is greater than the second-level time range and the second-level time range is greater than the third-level time range.

When the terminal enters a network and determines that the state of the indication information is "000", the system information block is received if the interval between a moment when the indication information is currently received and a moment when the system information block is last confirmed exceeds the magnitude of the first-level time range; otherwise, the system information block is not received. When the terminal enters the network and determines that the state of the indication information is "001", the system information block is received if the interval between a moment when the indication information is currently received and a moment when the system information block is last confirmed exceeds the magnitude of the second-level time range; otherwise, the system information block is not received. When the terminal enters the network and determines that the state of the indication information is "010", the terminal receives the system information block if the interval between a moment when the indication information is currently received and a moment when the system information block is last confirmed exceeds the magnitude of the third-level time range; otherwise, the terminal does not receive the system information block. When the terminal enters the network and determines that the state of the indication information is "011", the system information block is received. When the terminal enters the network and determines that the state of the indication information is "100", "101", "110" or "111", the system information block is received.

Application Example Two

In the example, the change condition of a system information block includes whether the system information block changes.

In the example, assuming that indication information about the system information block includes 2 bits, the indication information about the system information block can take the following 4 states: "00", "01", "10", and "11". The indication information taken as "00" indicates that the system information block within the first-level time range before the indication information is transmitted has not changed; the indication information taken as "01" indicates that the system information block within the second-level time range before the indication information is transmitted has not changed; the indication information taken as "10" indicates that the system information block within the third-level time range before the indication information is transmitted has not changed; the indication information taken as "11" indicates that the system information block within the third-level time range before the indication information is transmitted has not changed. The first-level time range is greater than the second-level time range and the second-level time range is greater than the third-level time range.

When the terminal accesses the network and determines that the state of the indication information is "00", the system information block is received if the interval between a moment when the indication information is currently received and a moment when the system information block is last confirmed exceeds the magnitude of the first-level time range; otherwise, the system information block is not received. When the terminal enters the network and determines that the state of the indication information is "01", the system information block is received if the interval between a moment when the indication information is currently received and a moment when the system information block is last confirmed exceeds the magnitude of the second-level time range; otherwise, the system information block is not received. When the terminal enters the network and determines that the state of the indication information is "10", the terminal receives the system information block if the interval between a moment when the indication information is currently received and a moment when the system information block is last confirmed exceeds the magnitude of the third-level time range; otherwise, the terminal does not receive the system information block. When the terminal enters the network and determines that the state of the indication information is "11", the system information block is received.

Application Example Three

In the example, the change condition of a system information block includes whether the system information block changes and the type of change of the system information block; in this case, part of states of the indication information indicate whether the system information block changes, and the remaining states indicate the type of change of the system information block. Multiple types of changes of the system information block exist and the multiple types are in one-to-one correspondence with multiple sets of predefined system parameters.

In the example, assuming that indication information about the system information block includes 3 bits, the indication information about the system information block can take the following 8 states: "000", "001", "010", "011", "100", "101", "110" and "111". The indication information taken as "000" indicates that the system information block within the first-level time range before the indication information is transmitted has not changed; the indication information taken as "001" indicates that the system information block within the first-level time range before the indication information is transmitted has changed; the indication information taken as "010" indicates that the system information block within the second-level time range before the indication information is transmitted has changed; the indication information taken as "011" indicates that the system information block within the third-level time range before the indication information is transmitted has changed. The indication information taken as "100" indicates that the system information block uses the first set of predefined system parameters; the indication information taken as "101" indicates that the system information block uses the second set of predefined system parameters; the indication information taken as "110" indicates that the system information block uses the third set of predefined system parameters; the indication information taken as "111" indicates that the system information block uses the fourth set of predefined system parameters. The first-level time range is greater than the second-level time range and the second-level time range is greater than the third-level time range.

When the terminal accesses the network and determines that the state of the indication information is "000", the system information block is received if the interval between a moment when the indication information is currently received and a moment when the system information block is last confirmed exceeds the magnitude of the first-level time range; otherwise, the system information block is not received. When the terminal enters the network and determines that the state of the indication information is "001", the system information block is received if the interval between a moment when the indication information is currently received and a moment when the system information block is last confirmed exceeds the magnitude of the second-level time range; otherwise, the system information block is not received. When the terminal enters the network and determines that the state of the indication information is "010", the terminal receives the system information block if the interval between a moment when the indication information is currently received and a moment when the system information block is last confirmed exceeds the magnitude of the third-level time range; otherwise, the terminal does not receive the system information block. When the terminal enters the network and determines that the state of the indication information is "011", the terminal receives the system information block. When the terminal enters the network and determines that the state of the indication information is "100", "101", "110" or "111", the system information block is received.

Application Example Four

In the example, the change condition of a system information block includes whether the system information block changes and the type of change of the system information block; in this case, part of states of the indication information indicate whether the system information block changes, and the remaining states indicate the type of change of the system information block. Multiple types of changes of the system information block exist and the multiple types are in one-to-one correspondence with multiple sets of predefined system parameters.

In the example, assuming that indication information about the system information block includes 2 bits, the indication information about the system information block can take the following 4 states: "00", "01", "10", and "11". The indication information taken as "00" indicates that the system information block within the first-level time range before the indication information is transmitted has not changed; the indication information taken as "01" indicates that the system information block within the first-level time range before the indication information is transmitted has changed. The indication information taken as "10" indicates that the system information block uses the first set of predefined system parameters; the indication information taken as "11" indicates that the system information block uses the second set of predefined system parameters.

When the terminal enters the network and determines that the state of the indication information is "00", the system information block is received if the interval between a moment when the indication information is currently received and a moment when the system information block is last confirmed exceeds the magnitude of the first-level time range; otherwise, the system information block is not received. When the terminal enters the network and determines that the state of the indication information is "01", the system information block is received. When the terminal enters the network and determines that the state of the indication information is "10" or "11", the system information block is received.

Implementation Mode Four

In the embodiment, the change information (i.e., N bits) about the system information block is jointly transmitted through master information blocks within a plurality of master information block periods (e.g., 40 ms).

A master information block within one master information block period merely carries part of bits of the change information about the system information block, and multiple parts of bits within the plurality of master information block periods are combined to form the complete change information about the system information block.

Application Example One

Figure 9:
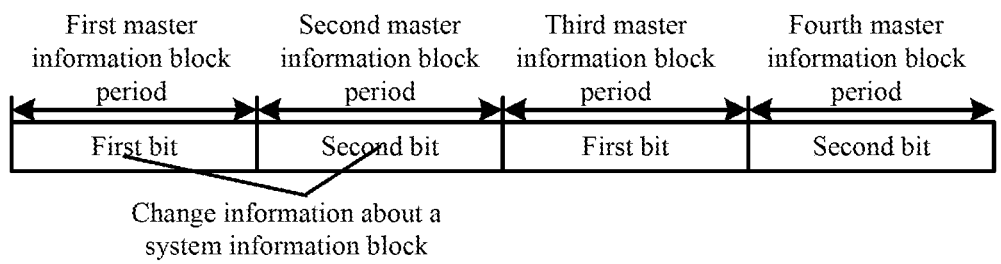
FIG. 9 is schematic diagram three illustrating transmission of 2-bit change information about a system information block according to an example.

FIG. 9 is schematic diagram three illustrating transmission of 2-bit change information about a system information block according to an example.

In the example, the change information about the system information block includes 2 bits.

The base station jointly transmits the 2-bit change information about the system information block within every two consecutive master information block periods, transmits 1 bit of the change information about the system information block through the master information block within one master information block period, and transmits the remaining 1 bit of the change information about the system information block through the master information block within the other master information block period.

The terminal jointly receives the 2-bit change information about the system information block within every two consecutive master information block periods, receives 1 bit of the change information about the system information block through the master information block within one master information block period, and receives the remaining 1 bit of the change information about the system information block through the master information block within the other master information block period.

With the method disclosed by the embodiment, the terminal entering the network according to different time intervals can accurately determine the time when the system information block does not change, thereby reducing unnecessary reception of system information blocks by the terminal and finally reducing the power consumption of receiving the system information by the terminal.

Embodiment Four

An embodiment of the present disclosure further provides a storage medium. In the embodiment, the storage medium may be configured to store program codes for performing the following steps: determining indication information about system information according to a system information state; where the indication information indicates a change condition of the system information within multi-level time ranges, and transmitting the indication information; or the storage medium may be configured to store program codes for performing the following steps: receiving indication information about system information, where the indication information indicates a change condition of the system information within multi-level time ranges, and determining, according to the indication information, whether to receive the system information.

In the embodiment, the storage medium may include, but is not limited to, a USB flash disk, a read-only memory (ROM), a random access memory (RAM), a mobile hard disk, a magnetic disk, an optical disk or another medium capable of storing program codes.

An embodiment of the present disclosure further provides a processor configured to execute programs. When executed, the programs execute the following steps: determining indication information about system information according to a system information state; where the indication information indicates a change condition of the system information within multi-level time ranges, and transmitting the indication information; or when executed, the programs execute the following steps: receiving indication information about system information, where the indication information indicates a change condition of the system information within multi-level time ranges, and determining, according to the indication information, whether to receive the system information.

For specific examples in the embodiment, reference may be made to the examples described in the above-mentioned embodiments and implementation modes, and repetition will not be made in the embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are merely some embodiments of the present disclosure and are not intended to limit the present disclosure. Those skilled in the art can make various modifications and changes. Any modifications, equivalent substitutions, improvements and the like within the spirit and principle of the present disclosure shall fall within the scope of protection of the present disclosure.

What is claimed is:

1. An information transmission method, comprising:
   determining, by a network device, indication information about system information according to a system information state, wherein the indication information indicates a change condition of the system information within multi-level time ranges, any one of the multi-level time ranges is equal to at least one superframe in magnitude; and
   transmitting, by the network device, the indication information;
   wherein the indication information comprises N bits, for an i-th bit among the N bits of the indication information, a value of "1" indicates that the system information has changed within a specified time range before the indication information, and a value of "0" indicates that the system information has not changed within the specified time range before the indication information, and i belongs to a set of $\{1, 2, 3, \ldots, N\}$, wherein the magnitude of the specified time range is equal to the magnitude of an i-th level time range corresponding to the i-th bit, and N is an integer greater than 1;

wherein magnitudes of two adjacent time ranges among the multi-level time ranges have a multiple relationship, wherein the multiple relationship is at least one-fold.

2. The method of claim 1, wherein the multi-level time ranges comprise N levels; wherein the N levels are in one-to-one correspondence with the N bits.

3. The method of claim 2, wherein determining the indication information about the system information according to the system information state comprises:

in a case where the system information changes, setting a value of the i-th bit of the indication information corresponding to the i-th level time range to "1" after the system information changes.

4. The method of claim 1, wherein transmitting the indication information comprises:

transmitting the indication information through a master information block.

5. The method of claim 4, wherein transmitting the indication information through the master information block comprises:

jointly transmitting the indication information through master information blocks within a plurality of master information block periods;

wherein each master information block within respective one of the plurality of master information block periods transmits a part of bits of the indication information, and multiple parts of bits of the indication information within the plurality of master information block periods are combined to form the change information about the system information block, and a number of part of bits of the indication information is greater than 1 and less than or equal to N.

6. The method of claim 1, wherein the change condition of the system information within the multi-level time ranges comprises: a change condition of the system information within the multi-level time ranges before the indication information is transmitted.

7. The method of claim 6, wherein the change condition of the system information comprises: whether the system information changes and/or a type of change of the system information.

8. An information transmission method, comprising:

receiving, by a terminal, indication information about system information, wherein the indication information indicates a change condition of the system information within multi-level time ranges, any one of the multi-level time ranges is equal to at least one superframe in magnitude; and determining, by the terminal, according to the indication information, whether to receive the system information;

wherein the indication information comprises N bits, for an i-th bit among the N bits of the indication information, a value of "1" indicates that the system information has changed within a specified time range before the indication information, and a value of "0" indicates that the system information has not changed within the specified time range before the indication information, and i belongs to a set of $\{1, 2, 3, \ldots, N\}$, wherein the magnitude of the specified time range is equal to the magnitude of an i-th level time range corresponding to the i-th bit, and N is an integer greater than 1;

wherein magnitudes of two adjacent time ranges among the multi-level time ranges have a multiple relationship, wherein the multiple relationship is at least one-fold.

9. The method of claim 8, wherein the multi-level time ranges comprise N levels; wherein the N levels are in one-to-one correspondence with the N bit.

10. The method of claim 9, wherein determining, by the terminal according to the indication information, whether to receive the system information comprises:

in response to determining that the N bits of the indication information are all "1", receiving, by the terminal, the system information, or in response to determining that the N bits are not all "1" and that an interval between a moment when the terminal currently receives the indication information and a moment when the system information is last confirmed exceeds a specified threshold value, receiving, by the terminal, the system information.

11. The method of claim 9, wherein the specified threshold value is equal to a maximum value among magnitudes of all time ranges corresponding to all bits having a value of 0 among the N bits.

12. The method of claim 8, wherein receiving the indication information about the system information comprises:

receiving the indication information about the system information through a master information block.

13. The method of claim 12, wherein receiving the indication information about the system information through the master information block comprises:

jointly receiving the indication information through master information blocks within a plurality of master information block periods;

wherein each master information block within respective one of the plurality of master information block periods transmits a part of bits of the indication information, and multiple parts of bits of the indication information within the plurality of master information block periods are combined to form the change information about the system information block, and a number of part of bits of the indication information is greater than 1 and less than or equal to N.

14. The method of claim 8, wherein the change condition of the system information within the multi-level time ranges comprises: a change condition of the system information within the multi-level time ranges before the indication information is transmitted.

15. An information transmission apparatus, comprising:
a processor; and
a memory for storing programs executable by the processor, wherein when executing the programs, the processor is configured to:

determine indication information about system information according to a system information state, wherein the indication information indicates a change condition of the system information within multi-level time ranges, any one of the multi-level time ranges is equal to at least one superframe in magnitude; and transmit the indication information;

wherein the indication information comprises N bits, for an i-th bit among the N bits of the indication information, a value of "1" indicates that the system information has changed within a specified time range before the indication information, and a value of "0" indicates that the system information has not changed within the specified time range before the indication information, and i belongs to a set of $\{1, 2, 3, \ldots, N\}$, wherein the magnitude of the specified time range is equal to the magnitude of an i-th level time range corresponding to the i-th bit, and N is an integer greater than 1;

wherein magnitudes of two adjacent time ranges among the multi-level time ranges have a multiple relationship, wherein the multiple relationship is at least one-fold.

16. An information transmission apparatus, comprising:
a processor; and
a memory for storing programs executable by the processor,
wherein when executing the programs, the processor is configured to implement the method of claim 8.

17. A non-transitory storage medium, comprising stored programs, wherein the programs, when executed by a processor, execute the method of claim 1.

18. A non-transitory storage medium, comprising stored programs, wherein the programs, when executed by a processor, execute the method of claim 8.

* * * * *